US010813368B1

(12) United States Patent
Glancy

(10) Patent No.: US 10,813,368 B1
(45) Date of Patent: Oct. 27, 2020

(54) SYSTEMS AND METHODS FOR THE PREPARATION OF TABLETS OF BOTANICAL EXTRACTS INCLUDING TEA

(71) Applicant: Gregory Glancy, Dallas, TX (US)

(72) Inventor: Gregory Glancy, Dallas, TX (US)

(*) Notice: Subject to any disclaimer, the term of this patent is extended or adjusted under 35 U.S.C. 154(b) by 0 days.

(21) Appl. No.: 16/671,103

(22) Filed: Oct. 31, 2019

(51) Int. Cl.
*A23F 3/32* (2006.01)
*A23F 3/24* (2006.01)
*A23F 3/42* (2006.01)
*A23F 3/18* (2006.01)
*B01D 3/38* (2006.01)
*A23F 3/26* (2006.01)

(52) U.S. Cl.
CPC ............ *A23F 3/32* (2013.01); *A23F 3/18* (2013.01); *A23F 3/24* (2013.01); *A23F 3/26* (2013.01); *A23F 3/426* (2013.01); *B01D 3/38* (2013.01)

(58) Field of Classification Search
CPC ........... A23V 2002/00; A23V 2250/21; A23V 2250/214; A23V 2300/20; A23V 2300/50; A23L 33/105; A23L 2/52; A23L 3/44; A23F 5/385; A23F 5/32; A23F 3/163; A23F 5/125; A23F 3/18; A23F 5/28; A23F 3/14; A23F 3/405; A23F 3/16; A23F 3/30; A23F 5/38; A23F 3/26; A23F 5/30; A23F 5/26; A23F 3/32
See application file for complete search history.

(56) References Cited

U.S. PATENT DOCUMENTS

| | | | |
|---|---|---|---|
| 3,438,784 A | 4/1969 | Clinton et al. | |
| 3,443,963 A | 5/1969 | Simon et al. | |
| 3,637,398 A | 1/1972 | Elerath | |
| 3,888,859 A | 6/1975 | Ponzoni et al. | |
| 3,903,312 A * | 9/1975 | Clinton | A23F 5/32 426/594 |
| 3,930,053 A | 12/1975 | Japikse et al. | |
| 3,997,685 A | 12/1976 | Strobel | |
| 4,324,808 A | 4/1982 | Wertheim et al. | |
| 4,900,574 A | 2/1990 | Smallwood et al. | |
| 5,538,750 A | 7/1996 | Yamaguchi et al. | |
| 6,953,592 B2 | 10/2005 | Darbyshire et al. | |
| 7,794,771 B2 | 9/2010 | Kessler | |
| 2003/0044505 A1* | 3/2003 | Chen | A23F 3/32 426/597 |
| 2007/0009640 A1* | 1/2007 | Hiramoto | A23F 3/06 426/597 |
| 2007/0054020 A1 | 3/2007 | Kumagai | |
| 2010/0100469 A1 | 4/2010 | Faella et al. | |

FOREIGN PATENT DOCUMENTS

| | | | |
|---|---|---|---|
| EP | 0011332 A1 | 5/1980 | |
| GB | 1209055 | 10/1970 | |
| GB | 1240842 | 7/1971 | |
| JP | 61152238 A * | 7/1986 | ............... A23F 3/16 |

OTHER PUBLICATIONS

JP 61-152238 A, Fujita et al. Machine Translation, Jul. 10, 1986 (Year: 1986).*

* cited by examiner

Primary Examiner — Hong T Yoo
(74) Attorney, Agent, or Firm — RegitzMauck PLLC; Dustin Mauck; Mike Regitz

(57) ABSTRACT

The present invention includes a method for creating a portable and quickly dissolving tea or other tea-like botanical tablet that can be used to prepare a flavorful, visually appealing, and clear cup of tea. The novel process may include the steps of: (1) extraction/infusion, (2) clarification, (3) concentrate preparation, (4) degassing the concentrate, and (5) chunkification. A spinning cone column may be used during the extraction/infusion step to preserve the aromatics and nutrients from the tea leaves, leading to better taste and improved retention of compounds thought to be beneficial to human health. A centrifuge may be used to remove suspended solids during the clarification step and a pressure chamber or sonication device may be used during the degassing step. Chunkification may involve the freezing of the concentrate followed by the removal of water from the concentrate to create a solid tablet of easily portable shape and size. The tea tablet quickly dissolves when added to hot or warm water, and it dissolves in cold water with some additional agitation.

9 Claims, 11 Drawing Sheets

SYSTEMS AND METHODS FOR THE PREPARATION OF TABLETS OF BOTANICAL EXTRACTS INCLUDING TEA

TECHNICAL FIELD

The present invention relates generally to the preparation of tablets of tea or tea-like botanical extracts that can dissolve in water, and more specifically, to infusing, extracting, clarifying, concentrating, degassing, and freeze-drying the tea or tea-like botanical extract to create a tablet that breaks apart quickly and dissolves in water to create a cup of tea.

BACKGROUND OF THE INVENTION

Tea, served either hot or cold, is said to be the second most consumed beverage in the world after water; and, as the potential health benefits of different types of tea are better understood, consumption should continue to increase. Despite this popularity, there have been limited innovations to improve the convenience of quickly, cleanly, and inexpensively enjoying a cup of tea. In Western culture, single servings of hot tea are most commonly served by adding boiling water and a tea bag to a cup and waiting three to five minutes with gentle agitation. After this waiting period, the tea bag is removed from the cup, and the hot tea can be enjoyed. Iced tea is customarily prepared by adding hot water and multiple tea bags or loose-leaf tea to a pitcher, and then waiting for three to five minutes with gentle agitation of the tea leaves. After this waiting period, the tea must be cooled slowly prior to serving over ice. If the tea is cooled too quickly, for example with ice cubes or placed in a refrigerator, it will "cream" or turn cloudy, creating a visually unappealing product. In both of these cases, boiling hot water, messy tea bags or loose-leaf tea, and time are required to enjoy a cup of tea.

While various types of tea bags and instant teas have been marketed and sold since the early and mid-20$^{th}$ century respectively, these options lose aroma and flavor during manufacturing, transportation, and storage prior to use. While some higher quality teabags are made with orthodox or whole leaf teas, the vast majority of mass market tea bags and instant teas are currently made from tea dust or fannings, which are the smallest sized leftover or waste by-products from the tea manufacturing process. Due to their near-microscopic size, tea dust and fannings have a much larger amount of surface area exposed to the environment when compared to larger pieces of tea leaves used in loose whole-leaf or orthodox tea, so these raw materials quickly and irreversibly release the aromatic compounds that comprise a large amount of the complexity of flavor in a cup of quality tea. Conventional production of instant tea products generally relies on the above mentioned tea dust and fannings as source materials and uses various heat-based dehydration methodologies, such as spray-drying, to dry a tea infusion, which releases a large portion of the volatile, aromatic flavor compounds from the tea infusion, resulting in a flat tasting finished product with very little of the complex flavor of fresh brewed tea left intact in the final product. Due to this loss of aromatics and flavor from the raw materials used in the manufacture of tea bags or the heat-based methods used to dry instant tea products, chemical sweeteners, acidifiers, and/or natural or artificial flavors are often added to the product to make it palatable to the consumer. Without these additives, the taste of the final tea product would not be appealing to the consumer.

Further, potential health benefits that could be derived from the cup of tea may be diminished during the manufacturing process. The large amount of surface area inherent to the tea dust/fannings used in teabag products exposes a large percentage of these raw materials to ambient air, which allows additional undesirable enzymatic browning and oxidation to occur during manufacturing, transport, and storage prior to consumption, leading to a brown presentation in the cup in the case of green tea products, loss of flavor and aroma, and the degradation of potentially beneficial-to-health compounds in the tea. The high heat-based drying methods used in the manufacture of conventional instant tea products release most of the desired volatile, aromatic flavor compounds and potentially alters or degrades the nutrients extracted from the original tea leaf source material. The later addition of chemicals and flavors fails to make up for this degradation and/or loss.

Most instant tea products are sold in a powder form, which makes the end product difficult to transport and use without making a mess. One conventional tea tablet product includes a powdered acid/base mixture creates a foam when added to water, but the acid/base mixture fundamentally masks or alters the taste of the tea. Another recently released product ("TeaDrop") uses sugar and ground tea leaves compressed together to create a solid, but this product relies on the use of sugar as a binder, which is undesirable to many health-conscious consumers, and an unattractive slurry of tea leaf matter is left at the bottom of the cup. A convenient product that would allow consumers to quickly make a cup of hot, room temperature, or cold tea would alleviate the logistical and processing problems with current offerings. Further, a manufacturing process that retains the inherent aromatics, nutrients, and flavors of the tea leaves would improve the taste and help retain any potential health benefits of the tea product. This process would also reduce the need to add chemicals or artificial flavorings to a loose-leaf, tea bag, or instant tea product. As discussed below, this novel process and product achieve these goals and offer numerous advantages over the current solutions in the marketplace.

BRIEF SUMMARY OF THE INVENTION

The novel process disclosed herein may include the steps of: (1) extraction/infusion, (2) clarification, (3) concentrate preparation, (4) degassing the concentrate, and (5) chunkification. The resulting product may be a quick dissolving tea tablet that will create a cup of tea when added to water and gently agitated. The tea tablet is portable, solid, and relies upon no chemical binders or disintegrants to assist with its dissolution in water. Further, the infusion and concentrate preparation steps preserve the aromatics and nutrients from the tea leaves, leading to better taste and preservation of compounds in the tea that may be beneficial to health. The preservation of aromatics and potentially health benefitting compounds eliminates the need for additional "chemicals" or sweeteners in the final product.

The first step of the claimed invention may include creating the tea extract through use of existing herb, spice, or other botanical extraction technology. A heated water infusion module, ultrasonic sound wave assisted infusion module, or a spinning cone column may be used to infuse the water and tea leaves. Minerals, additives, flavors, or additional compounds that can be removed from the final product by spinning in a centrifuge, may also be added at this stage to assist with clarification. Then the extract or liquid concentrate may be spun in the centrifuge to remove suspended solids and clarify the liquid extract.

The next step may be to obtain the proper density for the extract or liquid concentrate. In some embodiments of the present invention, the density of the liquid concentrate may be between 1.05 and 1.3 grams per cubic centimeter of the concentrate. This density may also be adjusted depending upon the type of tea leaves and flavoring to be used. If the extract is below the target density, then freeze concentration, which is efficient and may preserve aromatics, can be used to raise the density. Alternatively, freeze drying and subsequent rehydration, may be used to increase the density. If the extract is too dense, then distilled water may be added until the concentrate reaches the desired density. Then the air bubbles may be removed from the concentrate (degassing), which can be done by applying pressure to the concentrate. A vacuum chamber may also be used in addition to the application of pressure to remove the excess air that remains trapped in the concentrate. An ultrasonic device may also be used to apply sound energy to pop and remove any bubbles of trapped gases in the concentrate. Distilled water may be added again to achieve the desired density.

The concentrate may then be frozen in molds to create the desired shape of the tea tablet. Once the concentrate is frozen, the solidified product is removed from the molds. One last water removal step may be required to remove any additional water from the product. A drying module or freeze dryer may be used to remove this additional water from the product. These combined steps may be referred to as "chunkification."

The final result is a quickly dissolving tea or other tea-like botanical tablet that can be agitated in water to create a single serving cup of tea. The microscopic cavities of the tea tablet, which were created by the removal of water, draw in water through capillary action, causing the product to break apart quickly and enabling the dried solids to rapidly dissolve. Chemical binders are not required to help the tablet hold its shape, and additional disintegrants are not required to help it dissolve in water. The tea tablet dissolves rapidly in hot and room temperature water, especially with agitation, but can also dissolve in cold water after a few minutes with initial agitation. The resulting cup of tea is delicious, clear, and visually appealing. The tea tablet is solid, clean, and portable for consumption on the go.

The simple packaging of the tea tablet also removes the hassle of tea bags and keeps them out of the landfill. The tea tablet is simply added to water and there is no additional waste to manage. Tea leaves used in manufacture can be composted and returned to the tea growing fields, enabling tea farmers to be less reliant on fertilizers obtained from external sources.

BRIEF DESCRIPTION OF THE DRAWINGS

For a more complete understanding of the present invention, reference is now made to the following descriptions taken in conjunction with the accompanying drawing, in which.

DETAILED DESCRIPTION OF THE INVENTION

In some embodiments, the novel process disclosed herein may include the steps of: (1) extraction/infusion, (2) clarification, (3) concentrate preparation, (4) degassing the concentrate, and (5) chunkification. Chunkification will be further described herein, but it may involve the freezing and then the removal of water from the concentrate. Through this process a quick dissolving tea tablet may be prepared that can produce a cup of tea when added to water and gently agitated. Further, the novel concentrate preparation steps used in certain embodiments of the present invention preserve the aromatics and nutrients from the tea leaves, leading to improved preservation of compounds thought to be beneficial to health and better taste. Although tea leaves are discussed throughout this disclosure, the use of other botanicals or herbs are within the scope of the present invention.

The initial step may be creating a tea extract through existing extraction technologies. In some embodiments, the teas leaves are combined with hot or warm water for a specified time to brew or infuse the tea. Different types of tea leaves may require different amounts of time in the hot or warm water. For example, darker oxidized oolong, black, or post-fermented dark teas may be infused in 200° F. water for around an hour. Delicate green teas or lightly oxidized oolong teas may be infused in 100° F. water in a vacuum chamber for a longer or shorter time. In another embodiment, tea leaves are added to water and are exposed to high frequency sound waves by use of a sonication or ultrasonication device to encourage efficient extraction of wanted compounds from the tea leaves. In a preferred embodiment, a spinning cone column may be used to prepare the tea extract. The benefits of using a spinning cone column may include preserving the volatile aromatic compounds that may separate from the tea leaves or the extract during the extraction process. Vacuum steam distillation may be used to separate and preserve aromatic compounds from the tea leaves prior to conventional extraction in water. Other methods may also be used to create the tea extract in the present invention.

Figure 1:
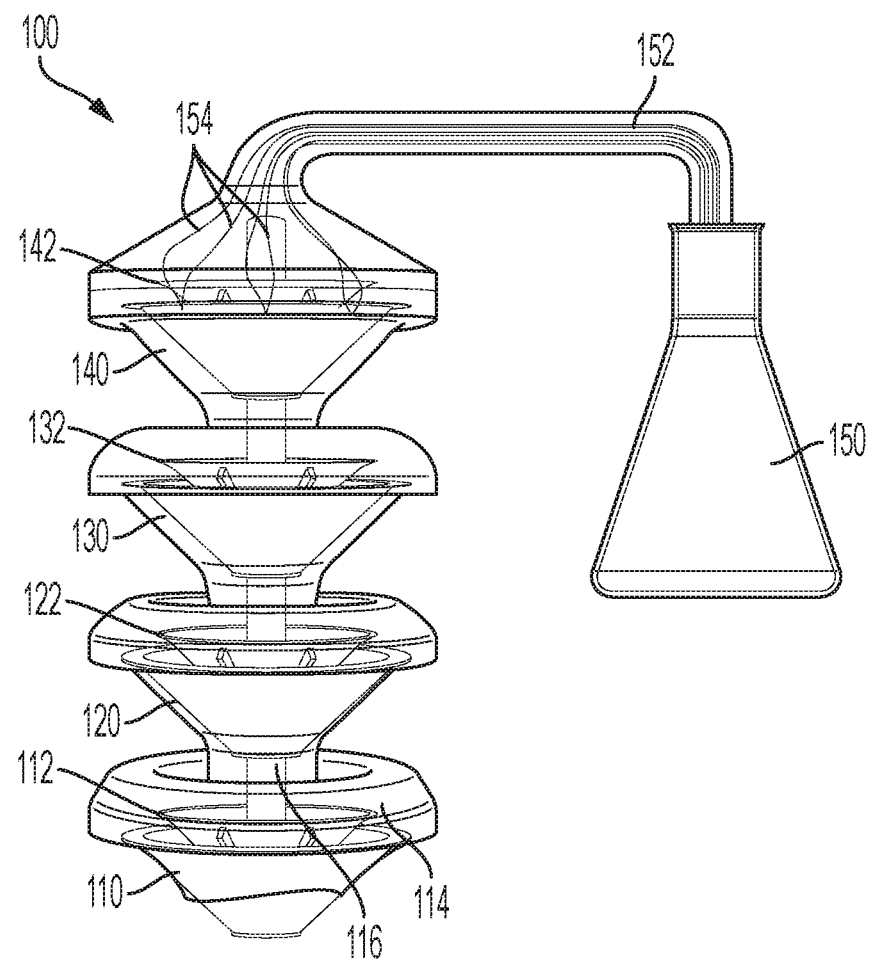
FIG. 1 shows a spinning cone column that may be used in an embodiment of the present invention.

FIG. 1 shows a spinning cone column 100 that could be used in the present invention. Whole tea leaves, cut tea leaves, or crushed tea leaves may be added to water and introduced into the spinning cone column 100 to create the tea extract. Each layer of the spinning cone column 100 comprises two cones. One bottom cone on each layer remains stationary, while the top cone on each layer spins. On a first layer, a first stationary cone 110 resides under a first spinning cone 112. The first spinning cone 112 is connected to a spinning shaft 116 that connects all the spinning cones of the spinning cone column 100. As the spinning shaft 116 spins, the spinning cone 112 spins as well. On a second layer, a second stationary cone 120 resides under a second spinning cone 122. On a third layer, a third stationary cone 130 resides under a third spinning cone 132, and on a fourth layer, a fourth stationary cone 140 resides under a fourth spinning cone 142. As the liquid spins through the four layers, the spinning cones 112, 122, 132, 142 allow the tea leaves to thoroughly mix with the water to create the tea extraction. The stationary cones 110, 120, 130, 140 have an aperture at the bottom of the cone to allow the liquid to escape to the next layer or lower spinning cone.

As this extraction process continues, aromatic and/or volatile compounds escape the brewing tea extract. This may include aromatic compounds that give the tea its flavor and aftertaste. In the spinning cone column 100, these aromatic and/or volatile compounds 154 that are now in the gas phase flow to the top. By catching them in a tube 152 and a beaker 150, the volatile and/or aromatic compounds can be saved, transitioned by to a liquid, and added to the tea extract after the spinning cone column 100 process. This way the original, desired volatile aromatic flavor components of the tea leaves can be added back to the extract as a liquid. In a preferred embodiment, the spinning cone column 100 provides a superior way to prepare the tea extract, while ensuring that the desired aromatic and/or volatile compounds can be added back to the tea extract. As discussed above, steam distillation may also be used in this step to separate and preserve the aromatics for later addition back into the extract as a liquid.

In some embodiments, other agents may be used with the tea extract at this stage to improve clarification or other issues with the tea extract. Agents, including those that contain and contribute minerals such as calcium, magnesium, potassium, or sodium to the solution, may be used as a clarifying agent to encourage haze-causing proteins or "tea cream" compounds to coagulate and/or precipitate out of solution before the tea extract is added to the centrifuge for clarification.

Figure 2A:
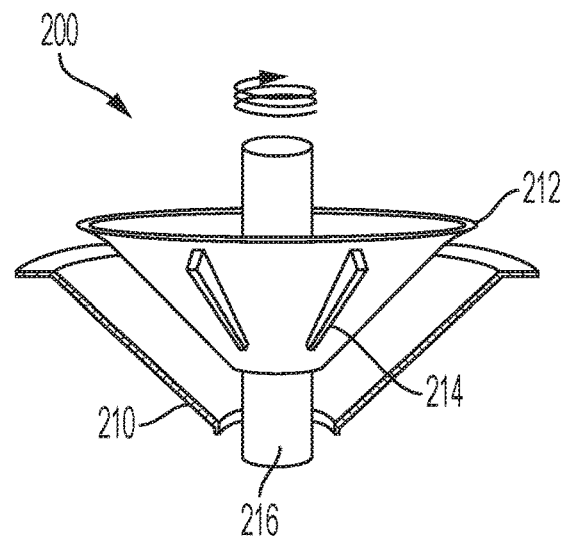
FIGS. 2A and 2B show an alternative spinning cone column that may be used in an embodiment of the present invention.
Figure 2B:
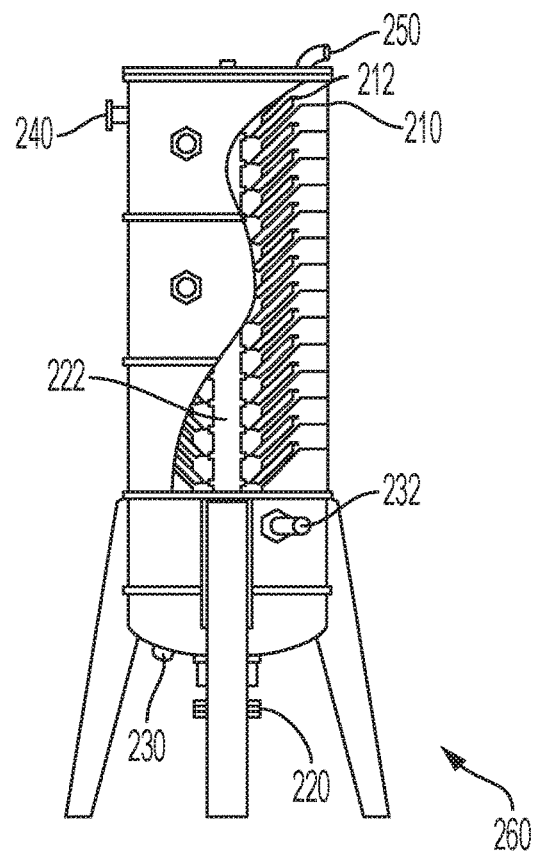

FIGS. 2A and 2B show an alternative spinning cone column that may be used in an embodiment of the present invention. FIG. 2A represents a single layer 200 of a larger spinning cone column 260. An interior shaft 216 is connected to a spinning cone 212, and this interior shaft 216 will spin all the spinning cones of the spinning cone column 260. A stationary cone 210 resides below the spinning cone 210, but does not move in conjunction with the interior shaft 216 like the spinning cone 212 does. An aperture at the bottom of the stationary cone 210 allows the liquid to escape down to the next level in the spinning cone column 260. This type of spinning cone column 260 is offered for sale by Flavourtech.

The spinning cone 212 and the stationary cone 210 are also shown in FIG. 2B. This commercial spinning cone column 260 has numerous layers of these cones 210, 212. As the spinning cones 212 spin, the tea leaves continue to mix with the water to create the extract. The tea mixture or tea slurry may enter the spinning cone column 260 through a liquid or slurry inlet 240. Brewing or infusion may be done before the tea mixture or tea slurry enters the spinning cone column 260. The aromatic and/or volatile compounds rise through the spinning cone column 260 and may escape through the vapor outlet 250. As discussed above, the aromatic compounds can then transition to a liquid phase and be added back to the tea extract to preserve those aromatics and flavors. An internal shaft 222 may resemble the interior shaft 216 shown in FIG. 2A. This internal shaft 222 may be controlled and spun by a pulley or drive belt 220 at the bottom of the spinning cone column 260. The internal shaft 222 may be connected to all the spinning cones 212 for controlling their movement. The liquid or tea extract may escape the spinning cone column 260 through the liquid outlet 230. The liquid escapes through the bottom outlet at 230, while the aromatic and/or volatile compounds escape as a gas through the top at outlet 250. A gas inlet 232 also enables steam or other gases to be added to the spinning cone column 260 to assist with this extraction process. The tea extract has been created through this process, but it may contain suspended solids, such as tea leaves, tea stems, or other organic materials.

Industrial ultrasonic liquid processors may also be used to infuse the tea leaves with water. For example, ultrasonic technologies manufactured by Industrial Sonomechanics may be used in the infusion step. With this technology, the release and loss of aromatics and volatile compounds may be reduced due to the ability to infuse tea leaves with water at lower temperatures.

Figure 3:
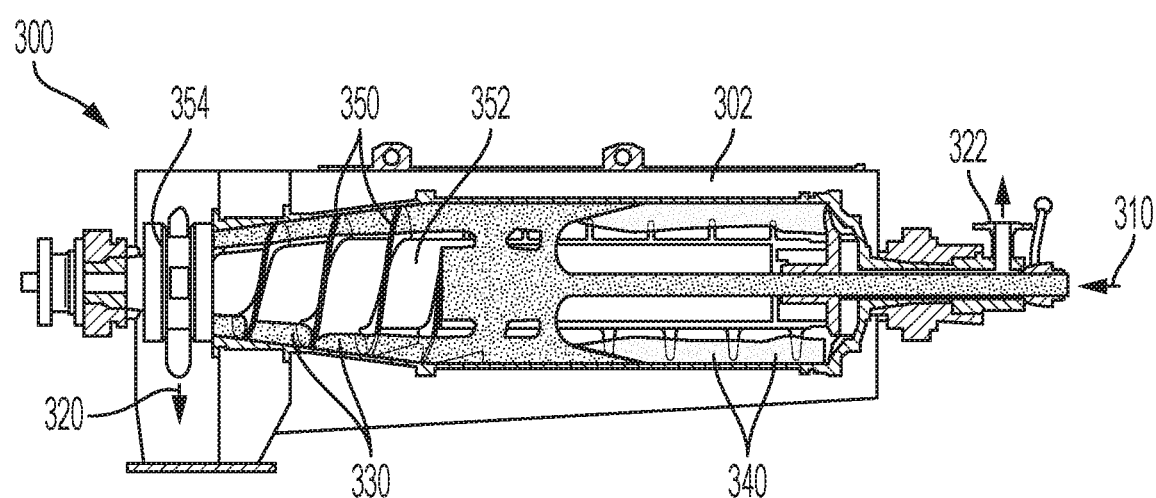
FIG. 3 shows a cross sectional view of a centrifuge that may be used in an embodiment of the present invention.

FIG. 3 shows a cross sectional view of a centrifuge 300 that may be used in certain embodiments of the present invention. The centrifuge 300 is designed to clarify and remove the suspended solids from the tea extract or liquid concentrate. The tea extract or liquid concentrate is fed into the centrifuge 300 through feed inlet 310. While centrifuges can take various forms, this version includes an outer shell 302 that creates a cavity for the liquid to be fed into. A shaft 352 that spins at high speeds can extend through the center of the cavity of the centrifuge 300. A motor 354 may be used to control the spin of the shaft 352. Numerous fins 350 may extend around the shaft 352 to provide additional surface area for the spinning shaft 352 and help to move the solids to the desired location. As the shaft 352 spins, the liquid 340 is pushed to the right side of the centrifuge 300, while the suspended solids 330 move to the left side of the centrifuge 300. Pressure may be applied to force the liquid out of the liquid outlet port 322 and to force the solids out of the solid outlet port 320. The liquid 340 discharged through the liquid outlet port 322 should be the clarified tea extract with the suspended solids removed. While numerous types of centrifuges may be used to accomplish this clarification step, in a preferred embodiment the centrifuge should spin at a minimum of 4000 rpm to remove suspended solids. In other embodiments, the liquid tea extract could be applied to numerous screens, cloths, or filters to clarify said liquid tea extract. Screens, cloths, or filters may also be used before or after the centrifuge 300 to enhance the clarification process.

In some embodiments, the liquid tea extract (after the solids are removed) would reach a desired density after these extraction and clarification steps. In some embodiments, a density of 1.05 to 1.3 grams per cubic centimeter is desired. Accordingly, 1.05 may be considered a lower portion of the desired density range and 1.3 may be considered an upper portion of the desired density range. In other embodiments, a smaller density range of 1.1. to 1.2 grams per cubic centimeter is desired. The type of tea and desired presentation of that tea may affect the desired density. If the extract is below the target density, then it may be concentrated using (1) freeze concentration, (2) freeze drying and subsequent rehydration to the target density or specific gravity, or (3) other concentration methods designed to preserve aromatic compounds using low temperatures or limited exposure to heat. Freeze concentration may be more efficient and preserve more aromatics than freeze drying and subsequent rehydration or other concentration methods. If the liquid tea extract is too thick or is in powder form, then distilled water would be mixed with the concentrate until the target density is achieved. Density measurements obtained by use of a pycnometer or digital density meter are the preferred method due to accuracy. A hydrometer may also be used to visually obtain a specific gravity reading. Specific gravity is also called relative density and it refers to the ratio of the density of a substance to the density of a reference substance, which in this case is water. With a density in the range of 1.05 to 1.3 grams per cubic centimeter (specific gravity of 1.05 to 1.2999999999999998), this indicates that the liquid tea extract at this stage is denser than water. This disclosure uses density measurements, but other embodiments may use specific gravity measurements during this step. Additional flavorings, preservatives, or other water-soluble compounds could be added to the liquid tea extract at this stage, but are not required in the present invention.

Figure 4:
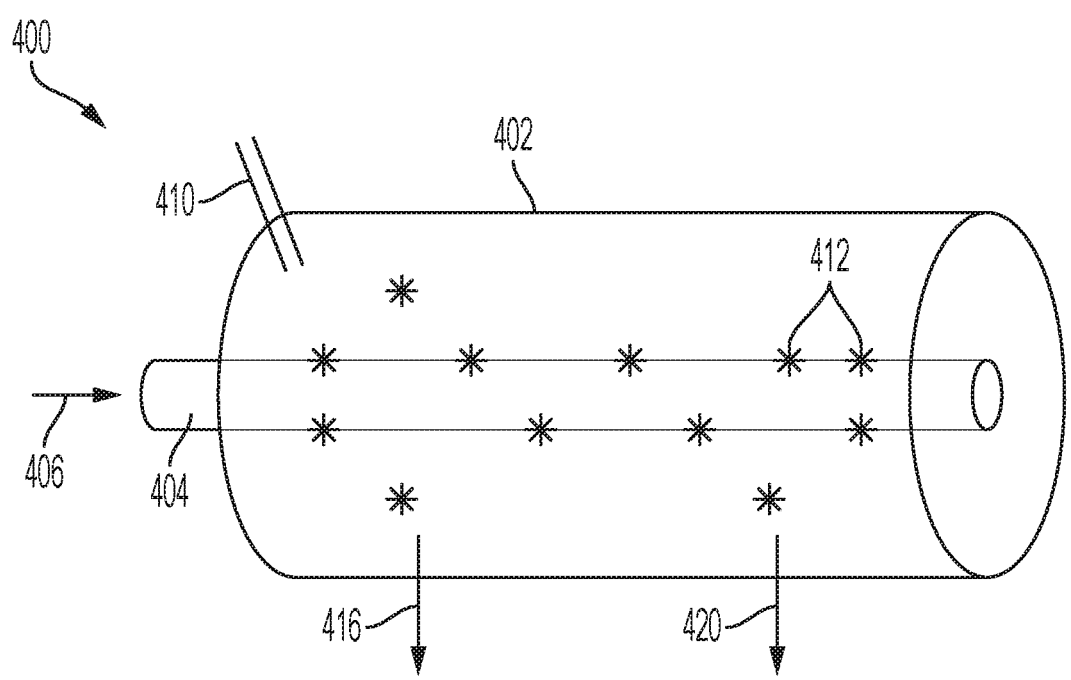
FIG. 4 shows a method of freeze concentration according to certain embodiments of the present invention.

FIG. 4 shows a method of freeze concentration 400 that may be used in certain embodiments of the present invention. While FIG. 4 does not show a commercial device, it provides a summary of freeze concentration. A cylindrical container 402 may be used with an internal tube or cylinder 404 for cooling the liquid. Thus, the internal tube or cylinder 404 should be made of a material that conducts temperature well, such as a metal. A coolant 406 is flushed into this internal tube or cylinder 404, while the tea concentrate 410 is flushed into the outer cylindrical container 402. The internal tube or cylinder 404 cools the tea concentrate to form ice and ice crystals 412. Then the system can pull out or remove the ice crystals and ice water 420 to leave the tea concentrate 416. Thus, the tea concentrate 416 is thicker or more dense than the tea concentrate 410 that was applied to the cylindrical container 402 because additional water in the form of ice has been removed from the tea concentrate 410. Due to the low temperatures, the aromatics do not easily escape the tea concentrate 410 in this process. This process may help to raise the density of the liquid tea extract to the desired density. Concentration may also be accomplished by freeze drying the liquid concentration to create a crystal or powder form. Subsequent rehydration with distilled water may be required after this freeze-drying step. The use of other technologies to raise the density of the tea concentrate are within the scope of the present invention.

After the liquid tea concentrate reaches the desired density, any air bubbles and/or trapped gases must be removed from the liquid. This can be done in numerous ways, but in a preferred embodiment, it is done by applying pressure to the liquid tea concentrate and then applying vacuum conditions through a vacuum chamber. While this method is further described below, the present invention is not limited to this process for removing the air bubbles and/or trapped gases from the concentrate.

Figure 5:
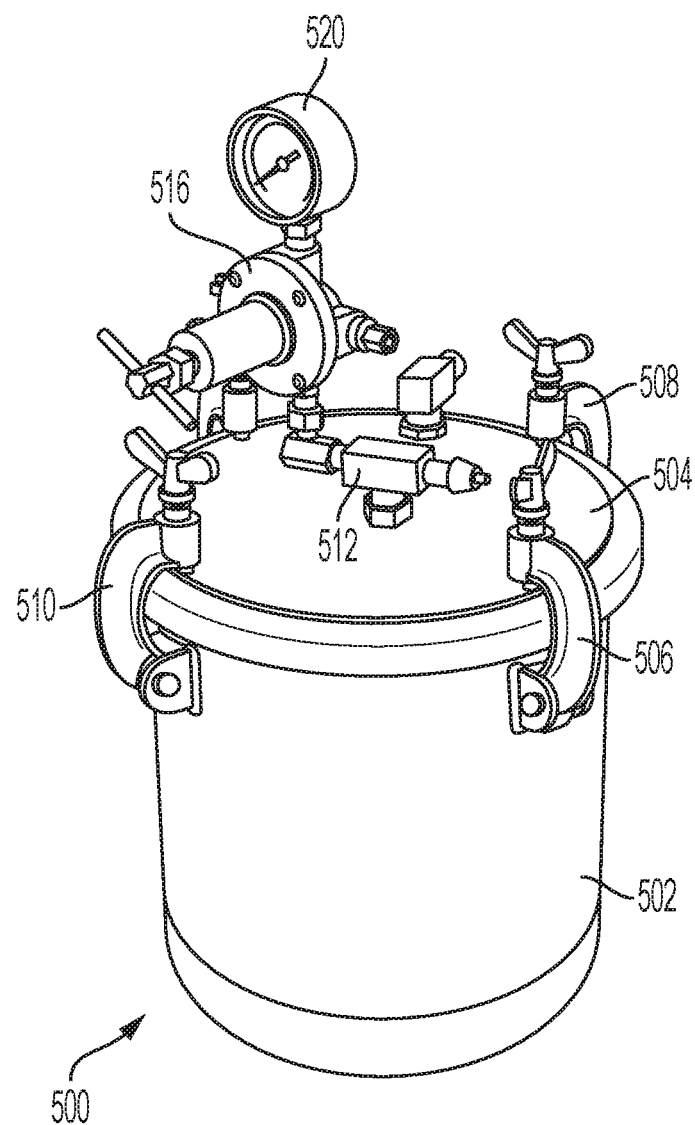
FIG. 5 shows a pressure chamber that may be used in an embodiment of the present invention.

FIG. 5 shows a pressure chamber 500 that may be used in an embodiment of the present invention. A cylindrical container 502 may hold the liquid that will be pressurized, whereby the liquid concentrate to be pressurized would be poured into the container 502. After the liquid concentrate is poured into the container, a first clamp 506, a second clamp 508, and a third clamp 510 may be applied to a lid 504 of the container 502 to seal the pressure chamber 502. These clamps 506, 508, 510 must be properly tightened so that the lid 504 does not pop off after the pressure is applied. A first valve 512 is connected to the lid 504 to enable the pressure of the container 502 to be measured and allow the gas to flow into the container 502 to increase the pressure. A second valve 516 connects a pressure gauge 520 to the first valve 512. This pressure gauge 520 indicates the pressure that exists inside the pressure chamber or container 502. This way gas can be added or released through the first valve 512 to achieve the desired pressure. Gas may be added to the pressure chamber 500 to increase the pressure to the desired PSI reading. In a preferred embodiment, pressurizing to around 70 PSI is ideal for removing the large gas bubbles. The use of other technologies to apply pressure to the concentrate are within the scope of the present invention.

Figure 6:
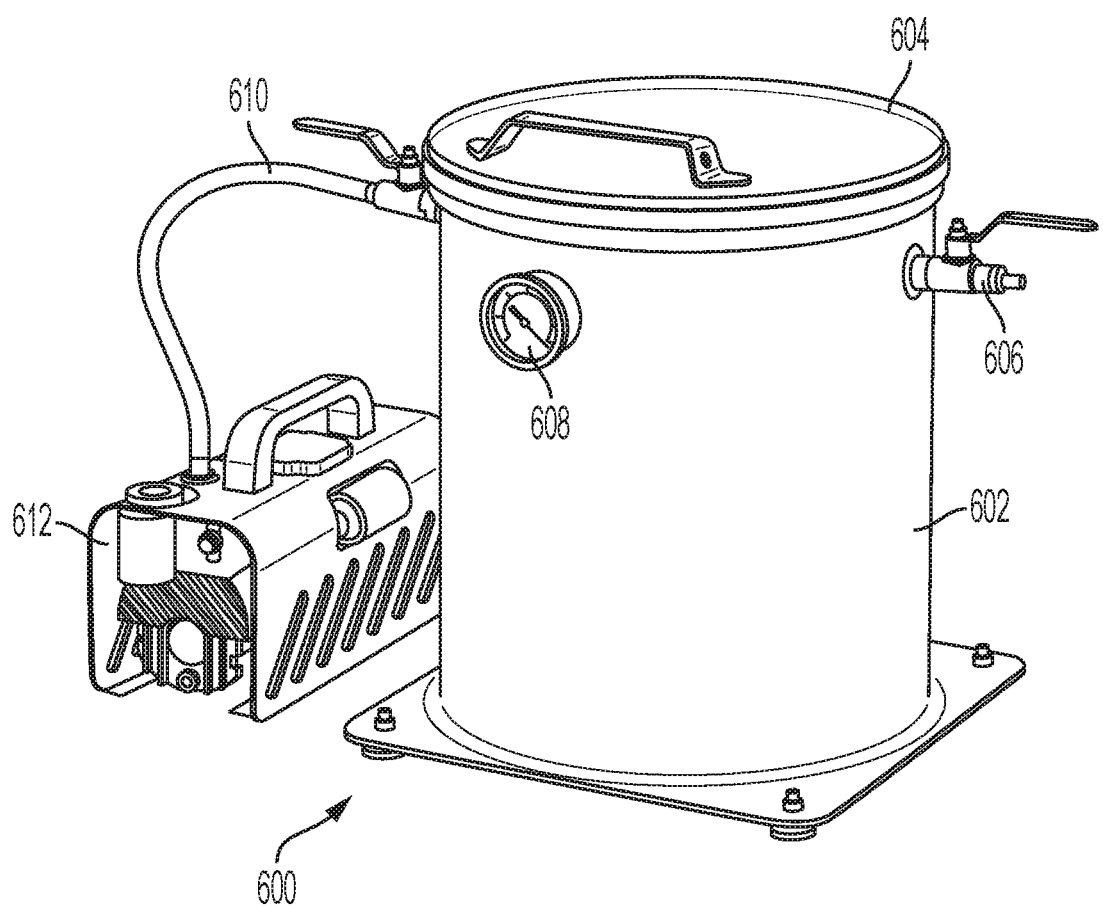
FIG. 6 shows a vacuum chamber that may be used in an embodiment of the present invention.

FIG. 6 shows a vacuum chamber 600 that may be used in an embodiment of the present invention. A cylindrical container 602 may hold the liquid that will be subject to the vacuum, whereby the pressure will be removed from the container 602 to create vacuum conditions. A lid 604 may be used to seal the cylindrical container 602, so that outside air may not enter the vacuum chamber 600. A vacuum device 612 is connected to the cylindrical container 602 through a connection hose 610. An additional valve 606 may be used for an additional connection to the cylindrical container 602. A pressure gauge 608 on the cylindrical container 602 indicates the pressure inside the vacuum chamber 600. Gas or air may be removed from the vacuum chamber 600 to create the vacuum conditions. The use of other technologies to apply vacuum-like conditions to the concentrate are within the scope of the present invention.

Vacuum chambers may also be used during the infusion process to limit the exposure of the infusion and tea leaves to ambient oxygen, which could enable oxidation or browning of the tea leaves during infusion. For example, delicate green teas or lightly oxidized oolong teas may be infused in a vacuum chamber at around 100° F. As mentioned above, teas that are less oxygen sensitive, such as darker oxidized oolong, black, or post-fermented dark teas may be simply infused in water without the use of a vacuum chamber.

High pressure conditions followed by vacuum conditions may be an efficient way to degas the liquid tea concentrate and/or remove all the air bubbles. In some embodiments, the liquid tea concentrate may be poured into the pressure chamber 500 and pressurized to around 70 PSI, which may pop the large gas bubbles. Then the resulting liquid tea concentrate may be poured into the vacuum chamber 600, where the pressure is lowered to vacuum conditions and released numerous times to remove as much of the trapped gas or air as possible. Some water may be lost during this process due to sublimation, so additional distilled water is added as needed to the mix to bring the liquid tea concentrate to the desired density. The importance of this step is to remove the gas or air bubbles from the liquid tea extract and not the exact process. While prior methods have used air bubbles to assist with the breakdown of a tablet, the tea tablet created according to the present invention may break apart and dissolve in the liquid without the use of air bubbles. In some embodiments, a sonicating wand may be used to degas the liquid tea concentrate. This sonicating wand applies sound energy to the liquid tea concentrate to agitate the particles in the solution and release the air bubbles and trapped gases.

Figure 7:
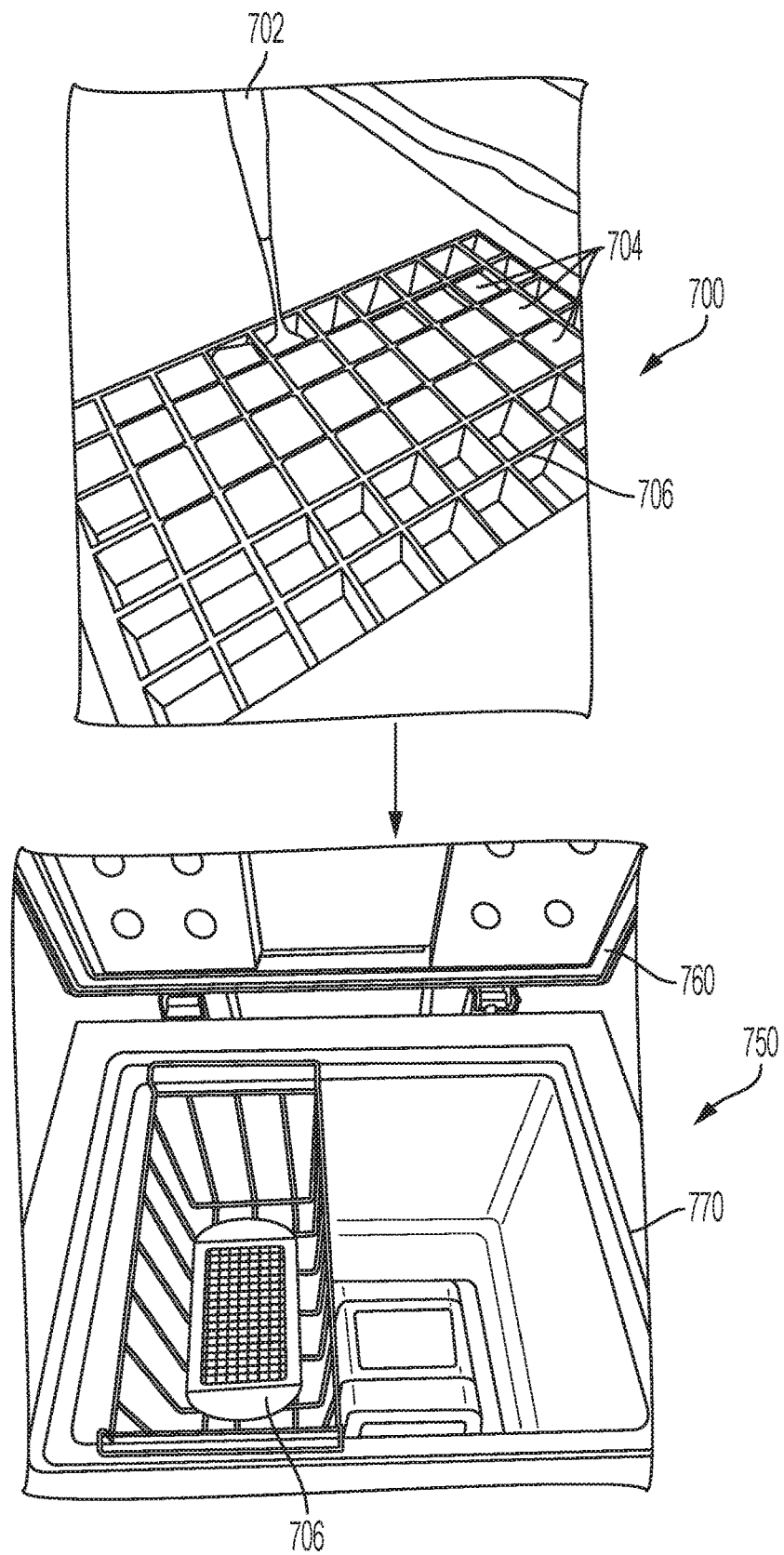
FIG. 7 shows a portion of the method of chunkification where a tea concentrate is frozen in molds according to certain embodiments of the present invention.

After the gas or air bubbles have been removed from the liquid tea concentrate, the chunkification process may begin. This step in the present invention is designed to create the solid tea tablets that will dissolve in water. FIG. 7 shows a portion of the method of chunkification where the liquid tea concentration is frozen in molds 700, 750 according to certain embodiments of the present invention. The liquid tea concentrate is initially poured into molds (or ice tray) 706 through a pipette 702 or other tube-like structure. Ultimately, the individual molds will be filled with the liquid tea concentrate 704. After the individual molds are filled, the mold (or ice tray) 706 will be inserted into a freezer 770 and a lid or door 760 to the freezer will be shut. The liquid tea concentrate 702, 704 will be frozen into the shape of the molds 706. In different embodiments of the present invention, the molds can take many different shapes and sizes. Similarly, the method or steps of freezing the liquid tea concentration can take many different forms and the present invention is not limited to this method or step. In one embodiment, the desired cube shape is created using a 1 cm×1 cm×1 cm ice tray to create single serving cubes.

Figure 8:
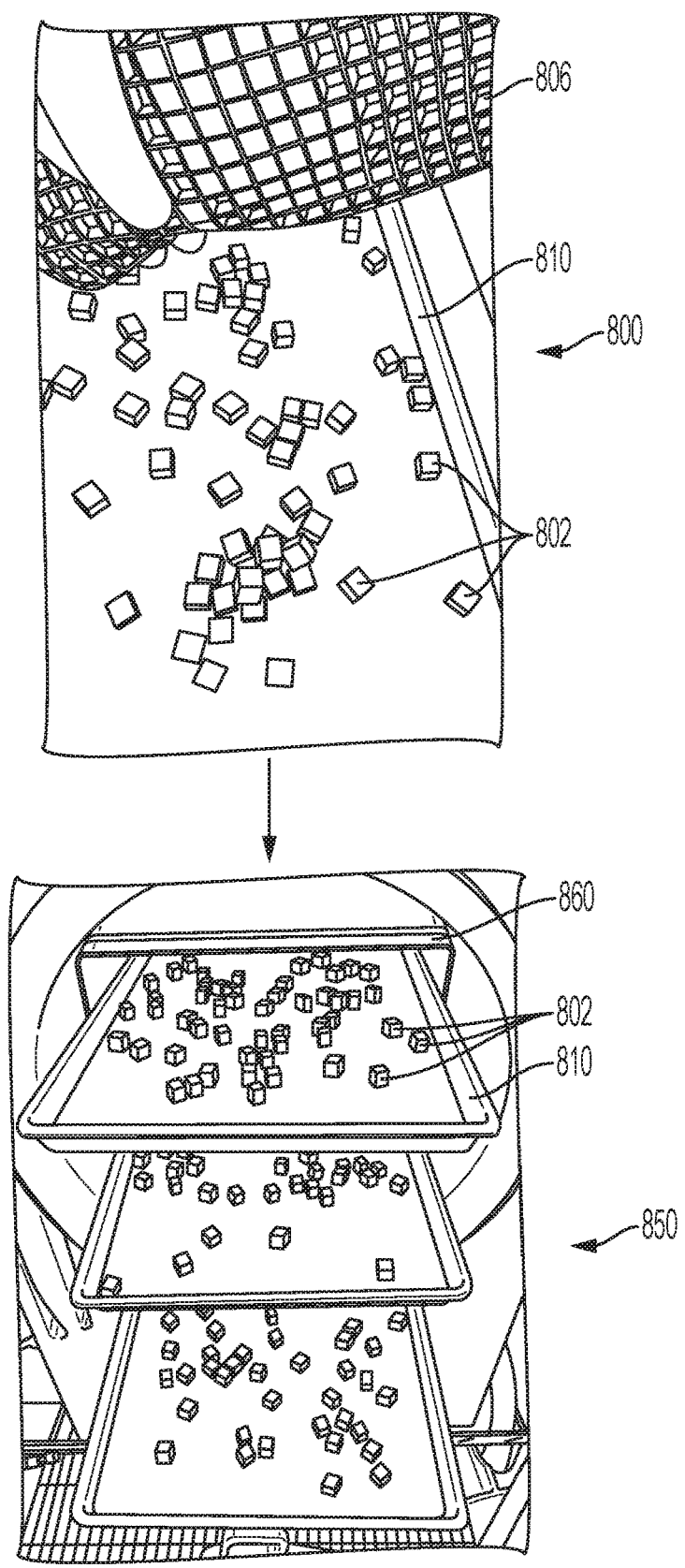
FIG. 8 shows a portion of the method of chunkification where the tea concentrate is freeze dried according to certain embodiments of the present invention.

FIG. 8 shows a portion of the method of chunkification where the frozen tea concentration is freeze dried 800, 850 according to certain embodiments of the present invention. After freezing, the frozen tea concentrate cubes 802 are released from the mold (or ice tray) 806 and put onto a tray 810. This way the individual cubes 802 can be put into a freeze-dryer 860 to remove the additional water from the tea concentrate cubes 802. After the tea concentrate cubes 802 have spent sufficient time in the freeze dryer 860, the solidified product should consist solely of the dried tea extract.

The finished product is a quickly dissolving brewed tea tablet. Due to the microscopic cavities left when the water is removed from the soluble tea concentrate, water is drawn into the finished tablet quickly and easily through capillary action. This causes the tea tablet to break apart quickly and completely, enabling the tea extract to completely dissolve in water. The tea tablet dissolves rapidly in hot and room temperature water, especially with agitation. The tea tablet also dissolves in cold water with agitation, although it may take longer than in hot or warm water. The end result is a visually appealing cup of tea, tea-like botanical infusion, or flavored tea. Unlike conventional powdered products, this tea tablet is easily portable and clean. No chemical binders are required to help it retain its shape, and no disintegrants are required to help it dissolve in water. The only ingredients are tea and/or other botanicals, optional flavoring compounds, and any minerals (calcium, magnesium, sodium, etc.) that may remain in the extract solution from compounds that are added to the purified water used in the infusion process prior to clarification in the centrifuge.

Figure 9:
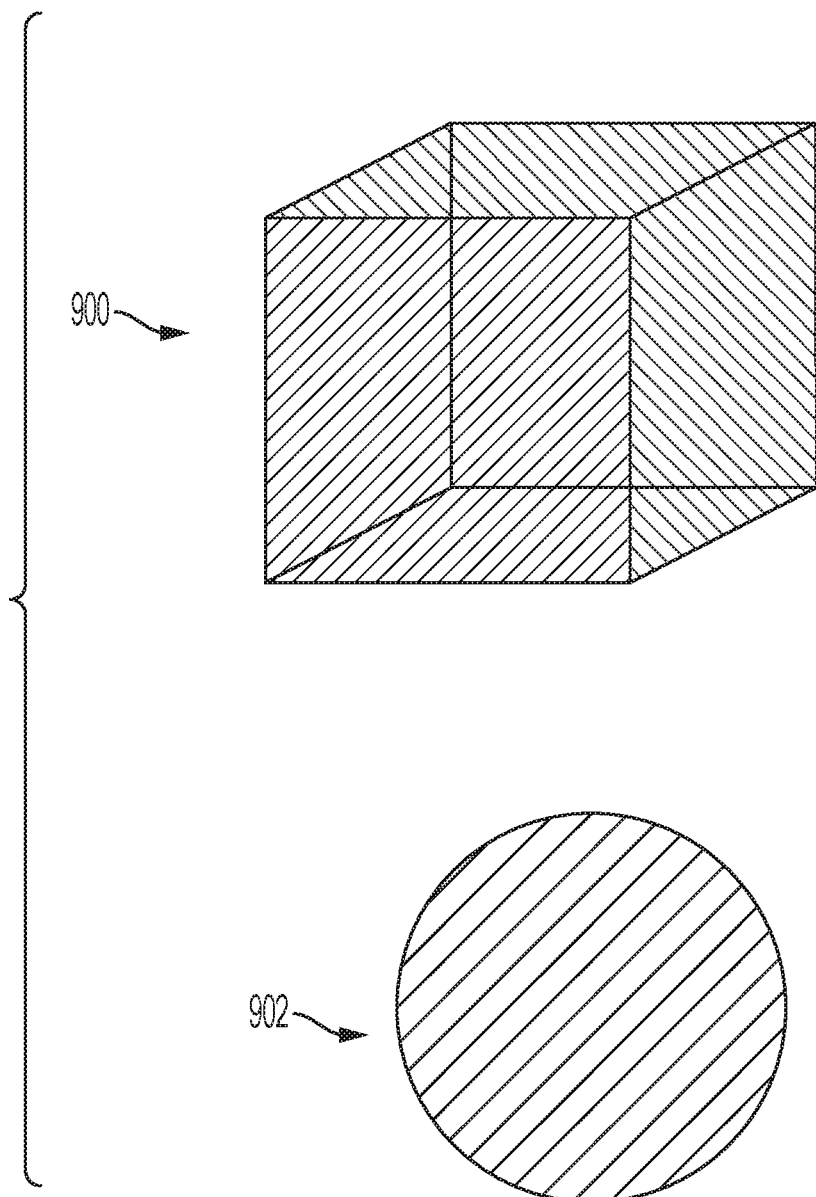
FIG. 9 shows different embodiments of the tea tablet according to certain embodiments of the present invention.
Figure 10:
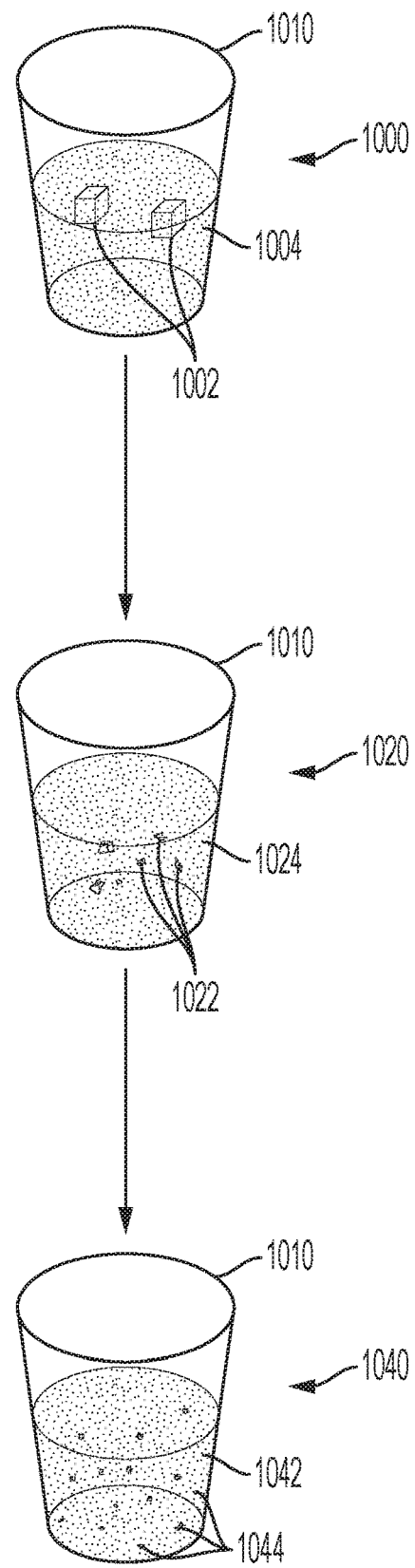
FIG. 10 shows two tea tablets dissolving in water according to certain embodiments of the present invention.

FIG. 9 shows different embodiments of the tea tablet according to certain embodiments of the present invention. As mentioned above, the tea tablet could take the form of a cube 900 or a sphere 902. The molds can be adapted to create any shape for the tea tablet. FIG. 10 shows two tea tablets dissolving in water 1000, 1020, 1040 according to certain embodiments of the present invention. Initially, the tea tablet or tablets 1002 are dropped in a cup 1010 that contains water 1004. Alternatively, the water 1004 may be poured on top of the tea tablets 1002 in the cup 1010. Immediately, the water enters the tea tablets 1002 and begins to break up the cubes into smaller pieces 1022. At this point, the water is becoming tea 1024, as the tea extract is dissolving in the water 1004. With most teas, the water 1024 is no longer colorless, but begins to take on color from the extract and darken. The smaller pieces 1022 then disappear in the final cup of tea 1042. While small particles 1044 are shown in step 1040, these small particles 1044 are completely in solution and cannot be seen without a microscope. The end result is a dark/fully colored, clear cup of tea 1042, where the tea tablets 1002 are fully dissolved. The tea tablet 1002 creates a cup of tea 1042 that is clear and visually attractive. Although tea leaves are discussed throughout this disclosure, the use of other botanicals or herbs are within the scope of the present invention.

Figure 11A:
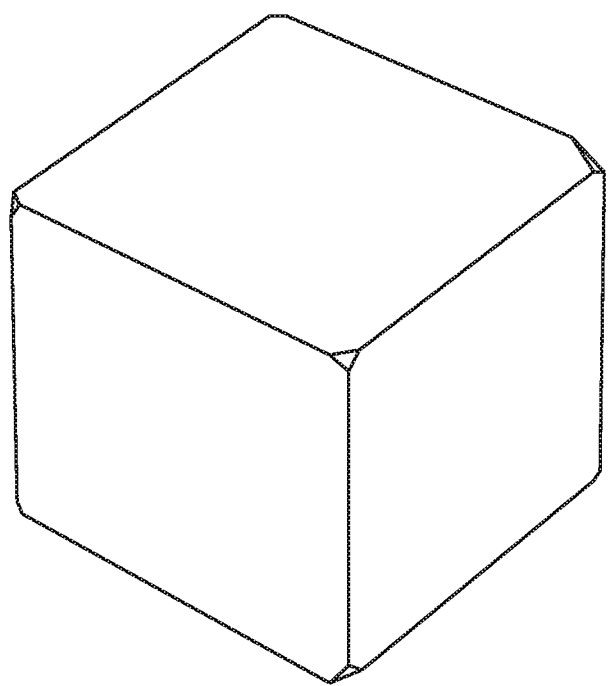
FIGS. 11A and 11B show alternative views of a tea tablet according to certain embodiments of the present invention.
Figure 11B:
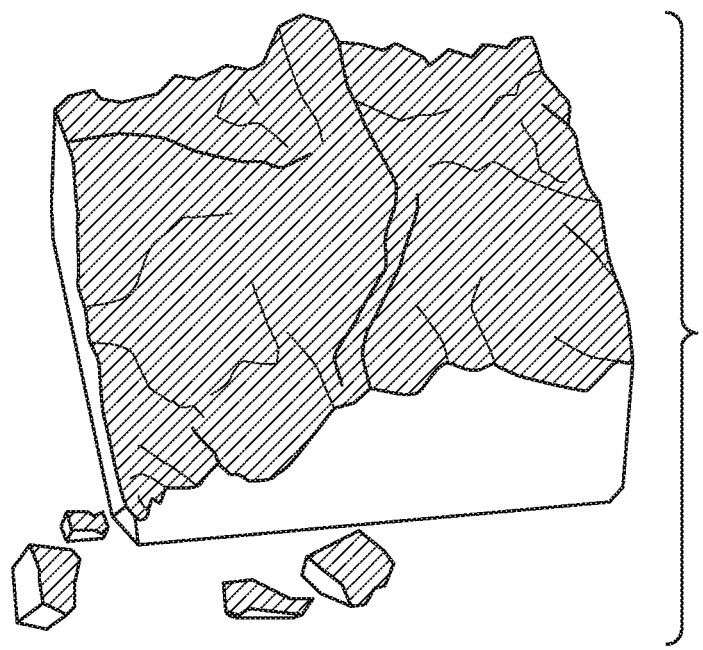

FIGS. 11A and 11B show alternative views of a tea tablet according to certain embodiments of the present invention. FIG. 11A shows the final tea tablet product that is shaped like a cube. FIG. 11B shows a cross-sectional view of the tea tablet product that breaks off when subjected to pressure or added to water. The various microscopic crevices and cavities allow the water to break apart and dissolve the tea tablet rapidly. The water removal process creates these microscopic crevices and cavities. Additionally, since the tea tablet is void of water, capillary action brings the water into the tablet to speed up the dissolving process. In the end, a solid, portable, quick-dissolving tea tablet allows the consumer to make hot, warm, or cold tea on the run simply with the addition of water, and there are no messy tea bags to dispose of when finished with the tea brewing process. There is no additional waste to manage.

As for packaging, the tea tablet is oxygen and moisture sensitive. Thus, in preferred embodiments the packaging should be nitrogen flushed to remove oxygen prior to sealing. For example, the tea tablets could be placed in a larger container or in individual containers and then nitrogen flushed before that container is sealed. The method of sealing the container should prevent oxygen, water, or other materials from entering the container. The tea tablet should also be packaged in a low humidity environment to limit ambient moisture content in the package, enabling the product to retain its structural integrity. External packaging should be air and water resistant as well. Packaged under the above conditions, this product should replace the use of conventional tea bags and improve the ability to efficiently transport tea for consumption due to the reduced shipping weight of non-extracted tea leaves. In some embodiments, the tea leaves used to create the extract could be composted and used as fertilizer in the very tea fields that they came from, which would put the leftover tea leaves to use instead of adding more waste to the landfill.

Traditional instant tea, produced by spray-dying or other heat-intensive methods, causes the loss of the majority of the aromatic compounds that make up the "top notes" of a "good" or "fresh" cup of tea. By using the spinning cone column and lyophilization (freeze drying) to dry the product, a much higher percentage of the tea's aromatic compounds are retained in the final product, which makes the experience of consuming this product much more like drinking a fresh brewed cup of tea. In a preferred embodiment, green tea extract can be rehydrated with boiling water and remain pleasant to drink, whereas if dry green tea leaves are brewed with boiling water instead of water at or below 175° F., the resulting cup of tea will usually be bitter, astringent, and unpleasant. Thus, the present invention may be an improvement to the taste and look of a conventional cup of tea.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for preparing at least one tea tablet, comprising:
    infusing water with at least one portion of a tea leaf to create a tea mixture;
    clarifying said tea mixture by removing said at least one portion of a tea leaf;
    preparing a tea concentrate from said clarified tea mixture;
    removing trapped gases from said tea concentrate by applying vacuum pressure to said tea concentrate;
    freezing said tea concentrate in at least one mold to create said at least one tea tablet; and
    freeze drying said at least one tea tablet to remove at least a portion of said water from said tea tablet.

2. The method for preparing the & tea tablet of claim 1, wherein said step of infusing water with at least one portion of a tea leaf further comprises employing a steam distillation module to collect at least a portion of aromatics from said tea mixture during said infusing step.

3. The method of preparing the tea tablet of claim 1, wherein said step of infusing water with at least one portion of a tea leaf further comprises employing a spinning cone column to collect at least a portion of aromatics from said tea mixture during said infusing step.

4. The method of preparing the tea tablet of claim 3, wherein said step of infusing water with at least one portion of a tea leaf further comprises adding said at least a portion of said aromatics to said tea mixture concentrate.

5. The method of preparing the tea tablet of claim 1, wherein said step of preparing the tea concentrate further comprises a tea concentrate within an approximate density range of 1.05 to 1.3 grams per cubic centimeter.

6. The method of preparing the tea tablet of claim 5, wherein said step of preparing the tea concentrate further comprises concentrating said tea mixture if said tea mixture is approximately at or lower than a density of 1.05 grams per cubic centimeter.

7. The method of preparing the tea tablet of claim 5, wherein said step of preparing the tea concentrate further comprises adding water to said tea mixture if said tea mixture is approximately at or higher than a density or of 1.3 grams per cubic centimeter.

8. The method of preparing the tea tablet of claim 1, wherein said removing step further comprises applying high pressure to said tea concentrate.

9. The method of preparing the tea tablet of claim 1, wherein said method further comprises packaging said at least one tea tablet by nitrogen flushing a container with said tea tablet therein before sealing said container.

* * * * *